(12) United States Patent
Prada et al.

(10) Patent No.: US 11,673,452 B2
(45) Date of Patent: Jun. 13, 2023

(54) OVEN FOR THE TRANSPORT OF FOOD, INSTALLABLE IN PARTICULAR ON MOTORCYCLES OR THE LIKE

(71) Applicant: BEYOND ENGINEERING S.R.L., Maranello (IT)

(72) Inventors: Anthony Byron Prada, Maranello (IT); Claudio Joel Giovini, Maranello (IT); Domenico Palladino, Maranello (IT); Marco Caputo, Maranello (IT)

(73) Assignee: Beyond Engineering S.r.l., Maranello (IT)

( * ) Notice: Subject to any disclaimer, the term of this patent is extended or adjusted under 35 U.S.C. 154(b) by 1027 days.

(21) Appl. No.: 16/335,871

(22) PCT Filed: Sep. 21, 2017

(86) PCT No.: PCT/IB2017/055722
§ 371 (c)(1),
(2) Date: Mar. 22, 2019

(87) PCT Pub. No.: WO2018/055541
PCT Pub. Date: Mar. 29, 2018

(65) Prior Publication Data
US 2020/0015632 A1 Jan. 16, 2020

(30) Foreign Application Priority Data
Sep. 22, 2016 (IT) .................. 102016000095435

(51) Int. Cl.
*B60H 3/02* (2006.01)
*A47J 47/14* (2006.01)
(Continued)

(52) U.S. Cl.
CPC ............ *B60H 3/024* (2013.01); *A47J 47/145* (2013.01); *B60H 1/00264* (2013.01); *B62J 9/28* (2020.02);
(Continued)

(58) Field of Classification Search
CPC .......................... B60H 3/024; B60H 1/00264; B60H 1/00592; B60H 1/18; B62J 9/28; A47J 47/145; B60Y 2200/12
See application file for complete search history.

(56) References Cited

U.S. PATENT DOCUMENTS 4,936,103 A * 6/1990 Newman ............ B60H 1/00592
211/186
5,505,122 A * 4/1996 Gerrit ................. B60H 1/00264
219/400
(Continued)

FOREIGN PATENT DOCUMENTS

DE 2431546 A1 1/1976
EP 1293154 B1 7/2004
(Continued)

*Primary Examiner* — Marc E Norman
(74) *Attorney, Agent, or Firm* — David B. Tingey; Bryant J. Keller; Kirton McConkie (57) ABSTRACT

The oven for the transport of food, installable in particular on motorcycles or the like, comprises a container securable to a motorcycle and having an inner chamber for the housing of food, an heating heat exchanger associated with the container and adapted to heat the air in the inner chamber, in which the heating heat exchanger has an inlet duct connectable to a scavenging system of the exhaust gases of the motorcycle and an outlet duct of the exhaust gases, and a dehumidifying heat exchanger associated with the container and adapted to dehumidify the air in the inner chamber, in which the dehumidifying heat exchanger comprises a cooling portion adapted to be hit by an air flow external to the container during the transit of the motorcycle, and a dehumidification portion positioned internally to the container and adapted to condense the water vapor present in the inner chamber.

17 Claims, 5 Drawing Sheets

(51) Int. Cl.
  *B60H 1/00*  (2006.01)
  *B62J 9/28*  (2020.01)
  *B60H 1/18*  (2006.01)

(52) U.S. Cl.
  CPC ............ *B60H 1/00592* (2013.01); *B60H 1/18* (2013.01); *B60Y 2200/12* (2013.01)

(56) References Cited

U.S. PATENT DOCUMENTS

| | | | |
|---|---|---|---|
| 5,525,782 A * | 6/1996 | Yoneno | H05B 6/6458 |
| | | | 219/401 |
| 5,582,095 A | 12/1996 | Rial | |
| 2003/0052499 A1 * | 3/2003 | Delzanno | B60H 1/00014 |
| | | | 296/22 |
| 2005/0091988 A1 | 5/2005 | Stewart et al. | |
| 2008/0023459 A1 * | 1/2008 | Leach | A21B 1/52 |
| | | | 219/202 |
| 2021/0113029 A1 * | 4/2021 | Wu | A47J 47/14 |
| 2021/0379961 A1 * | 12/2021 | Riahi | B62J 50/30 |

FOREIGN PATENT DOCUMENTS

| | | |
|---|---|---|
| ES | 2310109 A1 | 12/2008 |
| JP | H04268184 A | 9/1992 |
| KR | 20100099805 A | 9/2010 |
| WO | 92/16137 | 10/1992 |

\* cited by examiner

OVEN FOR THE TRANSPORT OF FOOD, INSTALLABLE IN PARTICULAR ON MOTORCYCLES OR THE LIKE

TECHNICAL FIELD

The present invention relates to an oven for the transport of food, installable in particular on motorcycles or the like.

PRIOR ART

The use is known and increasingly more widespread of home delivery services relating to ready-to-eat food.

It is further known that with such services, the need arises to make deliveries quickly and, above all, to deliver food which maintains its original characteristics as much as possible.

In particular, hot food, such as, e.g., pizzas, must maintain a perfect temperature during transport and must, as far as possible, maintain its original quality characteristics (smell and flavor) and physical characteristics (e.g., consistency, creaminess).

To try and cater to this need the use is known of thermal bags or containers which are transportable and/or can be secured to motorcycles or motor vehicles adapted to maintain the temperature of food.

Nevertheless, such solutions, besides not preventing the gradual cooling of the food, cooling which could prove decisive in case of long journeys, do not allow for the correct regulation of humidity.

In fact, the humidity created inside the containers is one of the major causes of quality and physical deterioration of food.

The use is also known of special ovens installable on motor vehicles and adapted to accommodate and heat the food during transport.

Nevertheless, such ovens of known type, despite maintaining an optimal temperature, do not allow for an effective control of humidity and air circulation.

By way of example, mention is made of the document EP 1 293 154 B1, which describes a device for maintaining food, especially pizzas, hot and transporting it by means of a motor vehicle.

Such device comprises a thermally isolated container provided, in its lower part, with a heat exchanger by means of which the heat from an external source is transmitted by conduction and irradiation. Preferably, the heat exchanger is connected to the motor vehicle exhaust circuit and exploits the thermal energy of the exhaust gases themselves.

The container has the shape of an essentially square case, in the floor of which the heat exchanger is embedded.

One of the four lateral walls of the case consists of a watertight door, while the three remaining lateral walls and the ceiling of the case consist of double walls enclosing some cavities which are connected to one another and connected to the inner chamber of the container.

A fan introduces air inside the cavities, so as to create an air current which passes from the cavities to the inner chamber, before exiting through a passage made on the bottom of the chamber itself.

The device also comprises a plurality of shelves arranged one on top of the other inside the inner chamber and adapted to accommodate the pizza boxes on them.

This known solution does however have a number of drawbacks.

In particular, the air recirculation alone between the cavities and the inner chamber and its exit through the passage made on the bottom of the chamber itself does not permit effectively minimizing the humidity in the air.

Furthermore, the solution described in such document appears considerably complex and, therefore, only realizable and applicable with costs far from negligible.

To this must be added the fact that such solution is not applicable in a simple and effective way for transport by motorcycles.

DESCRIPTION OF THE INVENTION

The main aim of the present invention is to provide an oven for the transport of food, installable in particular on motorcycles or the like, which allows maintaining the food to be transported at the optimal temperature, while maintaining at the same time the original quality and physical characteristics of the food itself.

Another object of the present invention is to provide an oven for the transport of food, installable in particular on motorcycles or the like which allows overcoming the aforementioned drawbacks of the prior art within the scope of a simple, rational, easy, efficient to use and cost-effective solution.

The aforementioned objects are achieved by the present oven for the transport of food, installable in particular on motorcycles or the like, according to the characteristics described in claim 1.

BRIEF DESCRIPTION OF THE DRAWINGS

Other characteristics and advantages of the present invention will become more evident from the description of a preferred, but not exclusive, embodiment of an oven for the transport of food, installable in particular on motorcycles or the like, illustrated by way of an indicative, but non-limiting example, in the attached drawings in which.

EMBODIMENTS OF THE INVENTION

With particular reference to these illustrations, reference numeral 1 globally indicates an oven for the transport of food, installable in particular on motorcycles or the like.

Specifically, the oven 1 according to the invention is securable to a motorcycle M and permits the transport of food, ensuring the maintenance of optimal temperature during transport and, at the same time, ensuring the maintenance of the original quality characteristics (smell, flavor) and physical characteristics (e.g., consistency, creaminess) of the food itself.

It is pointed out that, despite the illustrations showing the use of the oven 1 to transport pizzas, the oven 1 according to the invention can be successfully used to transport different types of hot and ready-to-eat food.

The oven 1 comprises at least one container 2 securable to a motorcycle and having at least one inner chamber 3 for the housing of food A.

Usefully, the inner chamber 3 is provided with a coating made of a thermally isolated material.

Preferably, the container 2 has a substantially box shape and is provided with a front portion having one door 4 for the access to the inner chamber 3.

Usefully, the container 2 can be provided with substantially aerodynamic surfaces so as to reduce the friction with the air during the transport with the motorcycle M.

For example, as shown in the illustrations with reference to a possible embodiment of the oven 1, the container 2 can be provided with an inclined upper portion 2a and with a curved rear portion 2b so as to reduce friction with the air.

In this respect, it is pointed out that in the present description terms used such as "rear", "front", "lateral", "upper" and "lower" make reference to the normal positioning of the oven 1 once installed on a motorcycle M, where "front portion" means the portion of the oven 1 provided with the door 4 and normally facing from the rear portion of the motorcycle M, while the expression "rear portion" means the portion of the oven 1 opposite the door 4 and normally turned towards the running direction of the motorcycle M.

Figure 1:
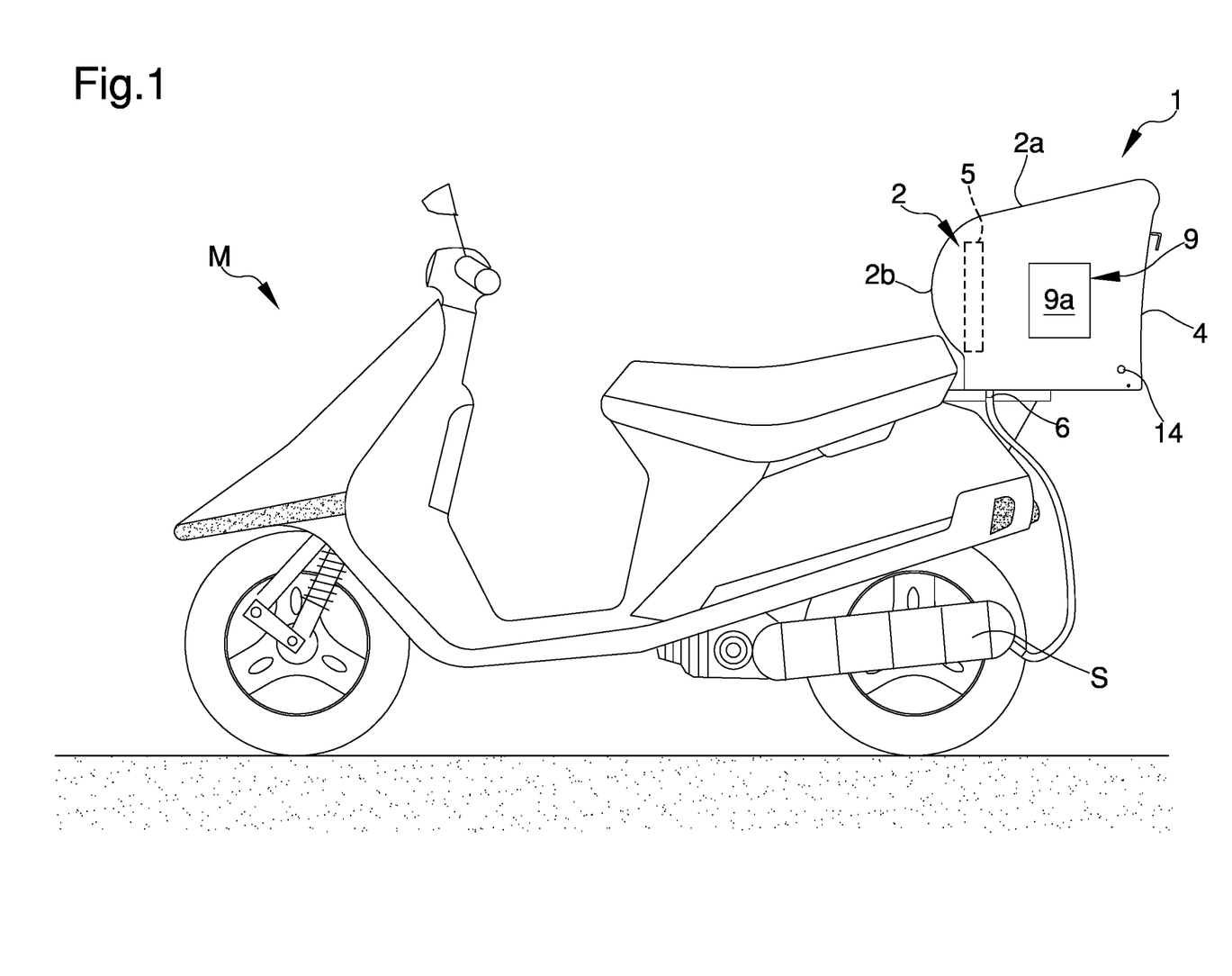
FIG. 1 is a schematic view of the oven according to the invention installed on a motorcycle.
Figure 2:
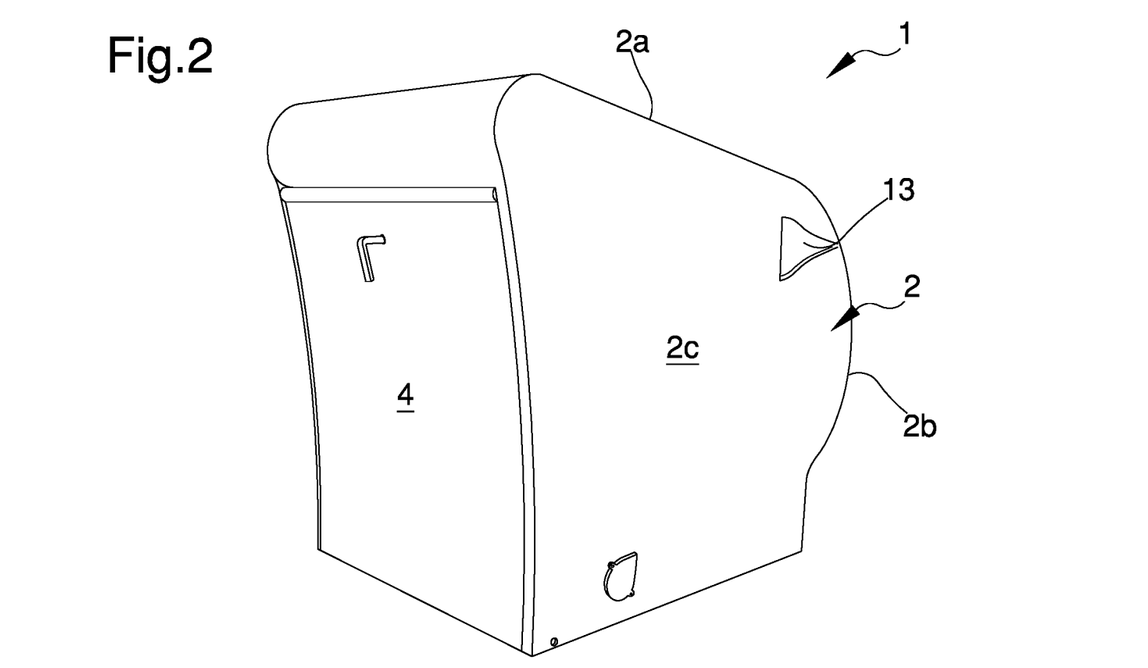
FIG. 2 is a perspective view illustrating a front portion of an oven according to the invention.
Figure 3:
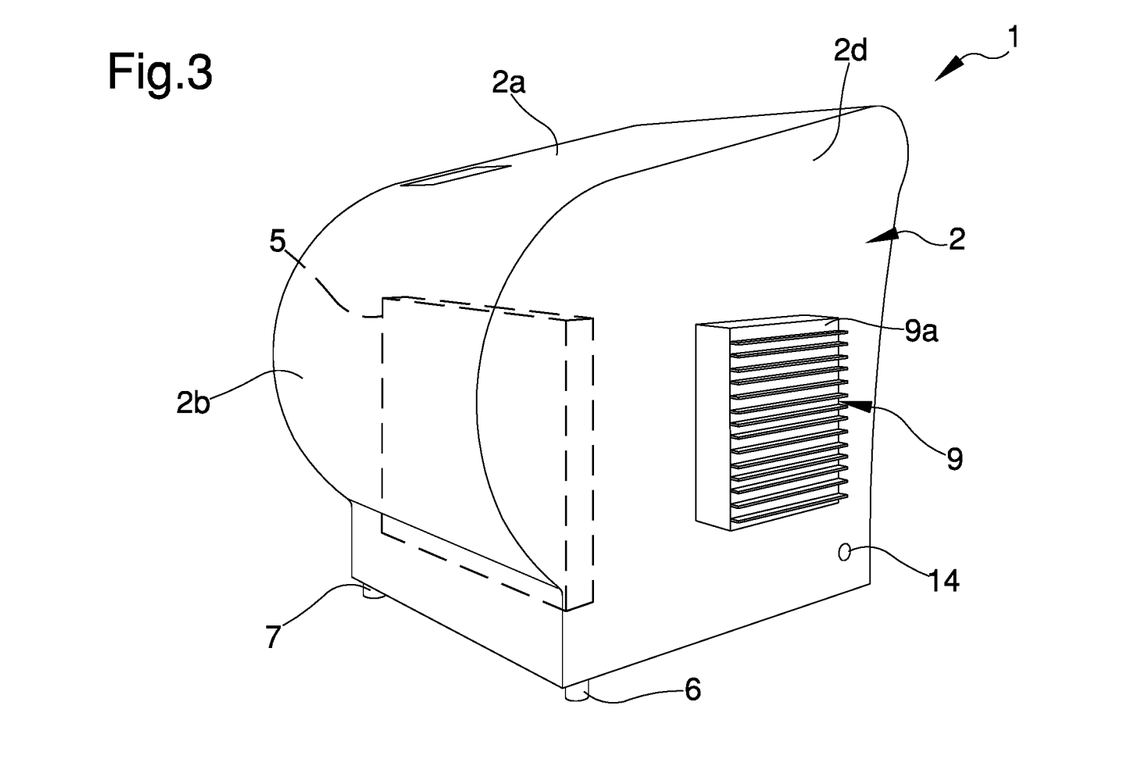
FIG. 3 is a perspective view illustrating a rear portion of the oven according to the invention.
Figure 4:
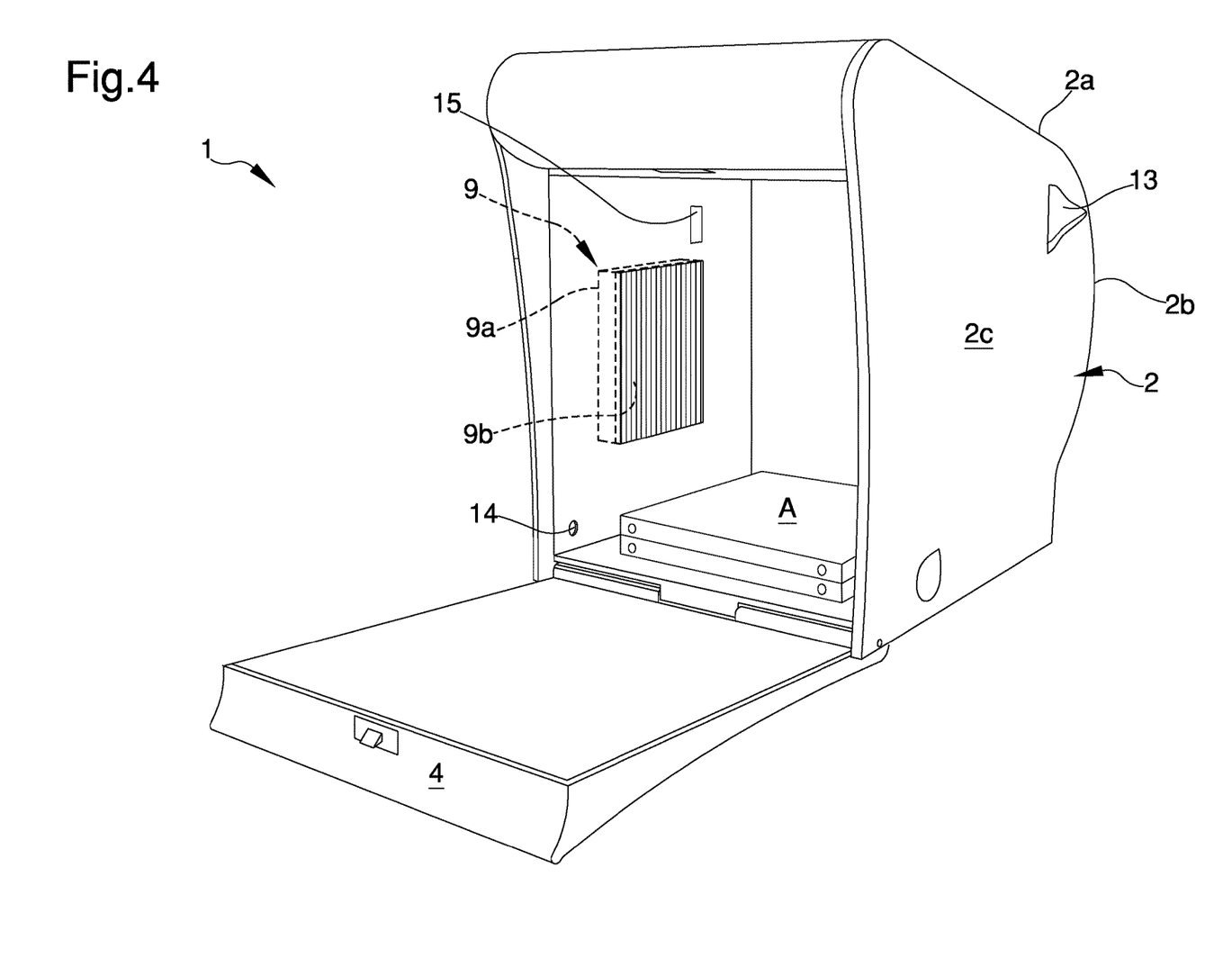
FIG. 4 is a perspective view illustrating the oven according to the invention with the open door.
Figure 5:
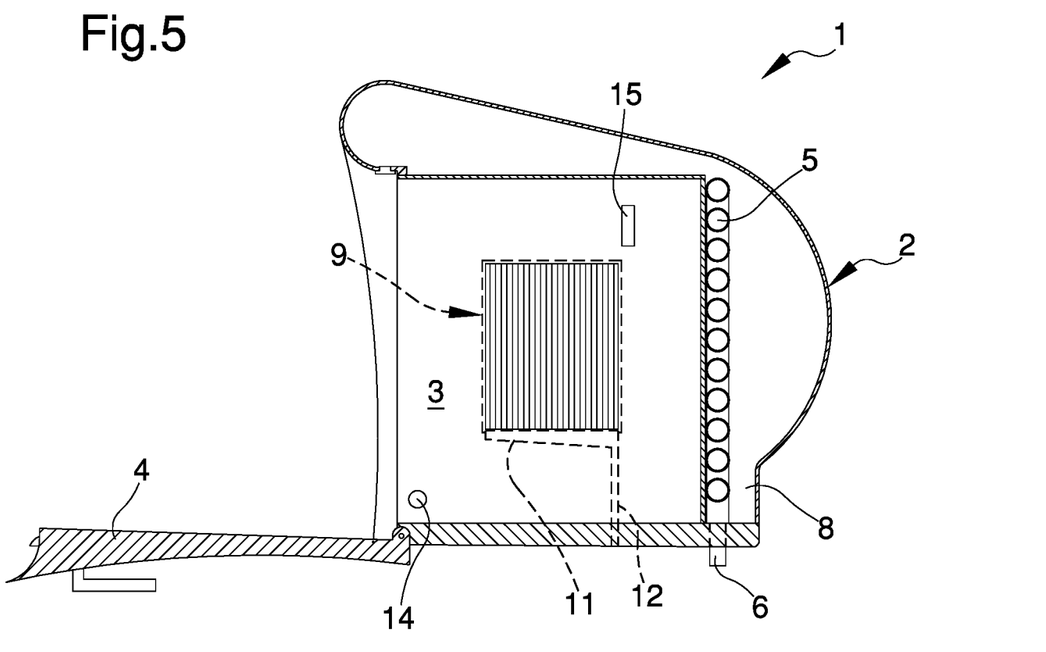
FIGS. 5 and 6 are lateral views and sectional views of the oven according to the invention.
Figure 6:
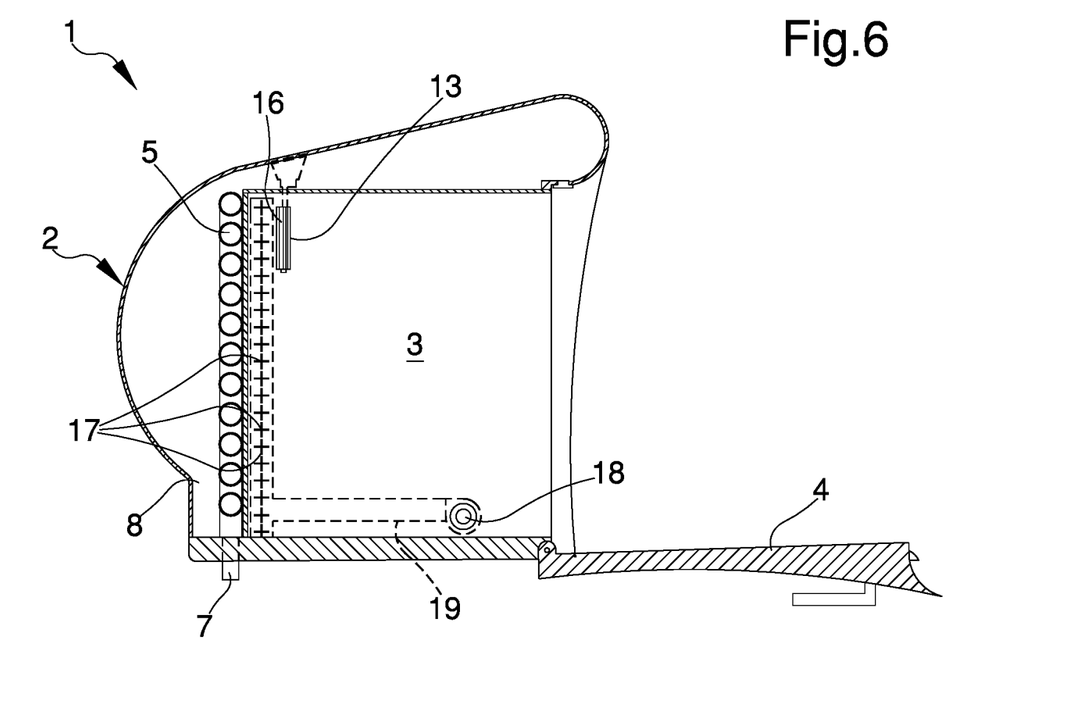
Figure 7:
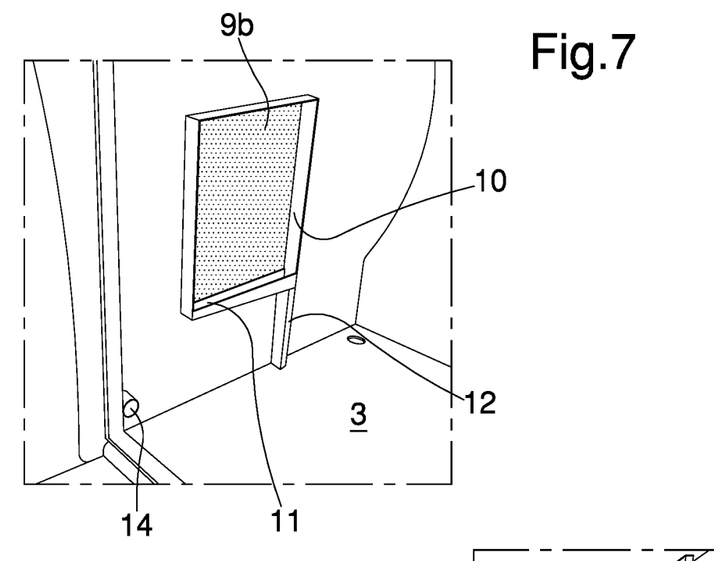
FIGS. 7, 8 and 9 show some details of the oven according to the invention.
Figure 8:
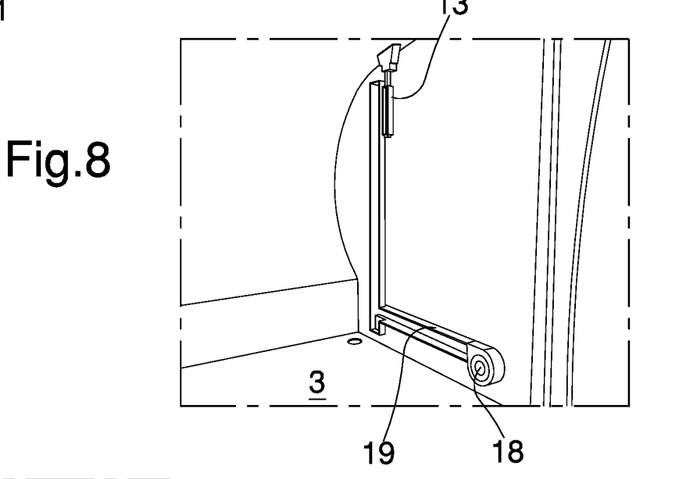
Figure 9:
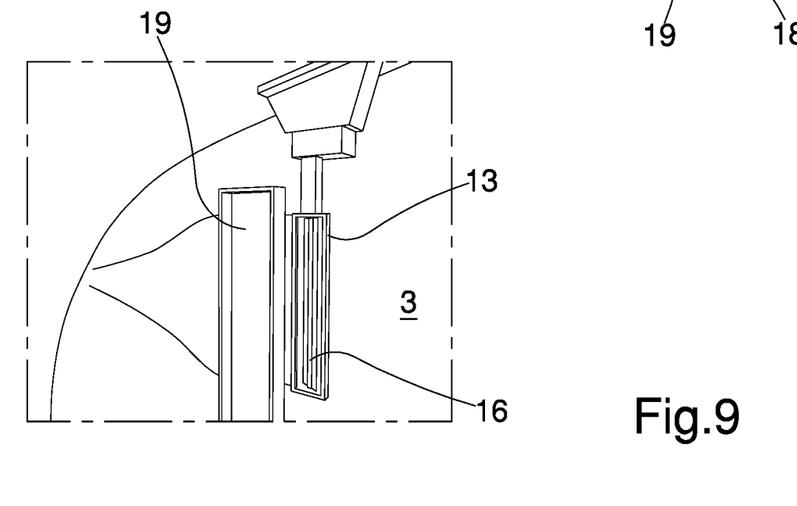

This possible positioning of the oven 1 is shown by way of example in FIG. 1. Different positioning of the oven 1 cannot however be ruled out.

The oven 1 also comprises at least one heating heat exchanger 5 associated with the container 2 and adapted to heat the air present in the inner chamber 3.

Advantageously, the heating heat exchanger 5 has at least one inlet duct 6 connectable to a scavenging system S of the exhaust gases of the motorcycle M and at least one outlet duct 7 of the exhaust gases.

Consequently, the heating heat exchanger 5 is connected to the scavenging system S of the motorcycle M and exploits the thermal energy of the exhaust gases of the motorcycle M, thermal energy which would normally be dispersed in the environment.

In particular, with reference to a preferred embodiment of the oven 1 shown in the illustrations, the heating heat exchanger 5 is arranged at the rear portion 2b of the container 2.

In detail, the container 2 comprises a first housing seat 8, made inside the rear portion 2b of the container 2, adapted to house the heating heat exchanger 5. Advantageously, the positioning of the heat exchanger 5 at the rear portion 2b of the container 2 enables an even heat distribution inside the inner chamber 3, thus ensuring the maintenance of all foodstuffs at the same temperature, regardless of the positioning of the food itself in the inner chamber 3.

The heating heat exchanger 5 can be composed of a hollow body having the inlet duct 6 and the outlet duct 7 and adapted to be crossed by the exhaust gas of the motorcycle M. Such hollow body is therefore able to transmit the heat collected by the exhaust gases by irradiation and/or conduction.

For example, the heat exchanger 5 can be composed of a substantially plate-shaped hollow boxy body or, alternatively, of a coil.

Advantageously, the oven 1 also comprises at least one dehumidifying heat exchanger 9 associated with the container 2 and adapted to dehumidify the heated air present in the inner chamber 3.

In particular, the dehumidifying heat exchanger 9 comprises at least one cooling portion 9a adapted to be hit by an air flow external to the container 3 During the transit of the motorcycle M, and at least one dehumidification portion 9b positioned internally to the container 2 and adapted to condense the water vapor present in the inner chamber 3.

This way, by means of the dehumidifying heat exchanger 9, the humidity of the heated air present in the inner chamber 3 can be kept at a perfect level, thus permitting to maintain the perfect quality and physical characteristics of the transported food over a prolonged period of time.

In particular, according to a preferred embodiment of the oven 1 illustrated in the figures, the cooling portion 9a of the dehumidifying heat exchanger 9 is at least in part protruding from the outer surface of the container 2.

Alternative embodiments of the oven 1 cannot however be ruled out wherein, for example, the cooling portion 9a of the dehumidifying heat exchanger 9 is substantially flush with the outer surface of the container 2.

Further embodiments can also comprise the positioning of the cooling portion 9a internally to the container 2 and the conveying and directing of the external air onto such cooling portion 9a by means of at least one air vent and/or at least one duct.

Preferably, the cooling portion 9a of the dehumidifying heat exchanger 9 is also placed at a lateral portion of the container 2. In such a way, this cooling portion 9a is hit directly by the external air during the transit of the motorcycle M.

Different positioning of the cooling portion 9a, and therefore of the dehumidifying heat exchanger 9 itself cannot however be ruled out, e.g., at the upper portion 2a of the container 2.

Furthermore, the use of a plurality of dehumidifying heat exchangers 9 cannot be ruled out. For example, the oven 1 can comprise a pair of dehumidifying heat exchangers 9 arranged at the opposite lateral walls of the container 2.

Still with reference to the preferred embodiment shown in the figures, the container 2 comprises at least a second housing seat 10 adapted to house at least partially the dehumidifying heat exchanger 9.

Usefully, the cooling portion 9a can be provided with a plurality of cooling fins. Advantageously, the oven 1 comprises conveying and outflow means 11, 12 of the condensate collected at the dehumidification portion 9b of the dehumidifying heat exchanger 9.

In particular, the conveying and outflow means 11, 12 comprise at least one condensate collection tank 11 arranged below the dehumidification portion 9b and at least one channel 12 connected to the tank 11 and adapted to allow the outflow of the condensate towards the outside of the container 2.

In particular, the tank 11 for the collection of the condensate is made at the lower portion of the second housing seat 10 and comprises an inclined surface adapted to convey the collected condensate towards the channel 12.

The channel 12 extends from the tank 11 downwards and ends up with a lower opening on the bottom of the container 2.

Advantageously, the oven 1 comprises adjustment means 13, 14, 15, 16 for adjusting the temperature of air in the inner chamber 3.

In particular, with reference to the particular embodiment of the oven 1 shown in the figures, the adjustment means 13, 14, 15, 16 comprise at least one inlet opening 13 formed on the container 2 and adapted to allow the entry of fresh air from the outside towards the inner chamber 3.

Furthermore, the adjustment means 13, 14, 15, 16 comprise at least one outlet opening 14 formed on the container 2 and adapted to allow the exit of hot air from the inner chamber 3 towards the outside.

Advantageously, the adjustment means 13, 14, 15, 16 comprise at least one temperature sensor 15 positioned inside the inner chamber 3, and variation means 16 of the opening/closure of at least one of the inlet opening 13 and the outlet opening 14, operatively connected to the temperature sensor 15 and adapted to vary the opening/closure depending on the temperature detected inside the inner chamber 3.

In particular, with reference to the preferred embodiment shown in the illustrations, the inlet opening 13 is made on the right lateral wall 2c of the container 2, in the proximity of the rear portion 2b.

Usefully, the inlet opening 13 is composed of a diverging air intake formed on a portion of the outer surface of the container 2.

The use of an inlet opening 13 arranged in different positions and of different shape cannot be ruled out, just as the use cannot be ruled out of more than one inlet opening 13.

Still with reference to the preferred embodiment shown in the illustrations, the outlet opening 14 is made on the left lateral wall 2d of the container 2, in the proximity of the door 4.

The use of an outlet opening 14 arranged in different positions and of different shape cannot be ruled out, just as the use cannot be ruled out of more than one outlet opening 14.

Still with reference to the preferred embodiment shown in the illustrations, the temperature sensor 15 is arranged inside the inner chamber 3, in the proximity of the dehumidifying heat exchanger 9.

The positioning of the temperature sensor 15 in different positions cannot however be ruled out, just as the use cannot be ruled out of a plurality of temperature sensors 15 located at different positions in the inner chamber 3.

Finally, still with reference to the preferred embodiment shown in the illustrations, the variation means 16 are composed of a butterfly valve positioned inside the inlet opening 13, controlled in rotation by a respective electric motor to regulate the opening/closing of the inlet opening itself.

Different solutions cannot however be ruled out.

With particular reference to the use of the oven 1 for the transport of pizzas inside traditional containers (cardboard boxes or the like), the oven 1 can comprise air blowing means 17, 18, 19 arranged inside the inner chamber 3 and adapted to take hot air from the inner chamber itself and to blow a plurality of flows of hot air inside the respective holes formed on the containers A stacked one on top of the other inside the inner chamber 3.

Preferably, the blowing means 17, 18, 19 comprise a plurality of blowing elements 17 of respective air flows, positioned at different and predefined heights and substantially aligned with each other.

Furthermore, the blowing means 17, 18, 19 comprise at least one suction fan 18 arranged in the inner chamber 3 and connected to the blowing elements 17. The fan 18 is adapted to suction the hot air from the inner chamber 3 and to send the suctioned hot air towards the blowing elements 17.

In particular, the fan 18 can be connected to the blowing elements by means of a special duct 19.

Usefully, according to a preferred embodiment, each of the blowing elements 17 is composed of one vertical slot and of a horizontal slot crossed together and formed directly on the coating of the inner chamber 3. This way, the air flows are directed correctly towards the holes made on the containers A, even when using containers A of different sizes.

It has in practice been ascertained that the described invention achieves the intended objects.

In particular, the fact is underlined that the oven for the transport of food according to the invention allows keeping the food transported by a motorcycle at the optimal temperature, also maintaining a perfect humidity level and, therefore, preserving the original quality and physical characteristics of the food itself.

The invention claimed is:

1. An oven for transport of food, installable on motorcycles, comprising:
    at least one container securable to a motorcycle and having at least one inner chamber for housing food,
    at least one heating heat exchanger associated with said at least one container and adapted to heat air in said at least one inner chamber, wherein said at least one heating heat exchanger has:
        at least one inlet duct that is connectable to a scavenging system of exhaust gases of said motorcycle,
        at least one outlet duct of said exhaust gases of said motorcycle,
    at least one dehumidifying heat exchanger associated with said at least one container and adapted to dehumidify the air in said at least one inner chamber, in which said at least one dehumidifying heat exchanger comprises at least one cooling portion adapted to be hit by an air flow external to said at least one container during transit of the motorcycle, and
    at least one dehumidification portion positioned internally to said at least one container and adapted to condense water vapor present in said at least one inner chamber.

2. The oven according to claim 1, wherein said at least one cooling portion of the at least one dehumidifying heat exchanger is at least in part protruding from an outer surface of said at least one container.

3. The oven according to claim 1, wherein said at least one cooling portion of the at least one dehumidifying heat exchanger is substantially flush with an outer surface of said at least one container.

4. The oven according to claim 1, wherein said at least one cooling portion of the at least one dehumidifying heat exchanger is placed in at least one lateral portion said at least one container.

5. The oven according to claim 1, comprising conveying and outflow means of condensate collected on said at least one dehumidification portion of said at least one dehumidifying heat exchanger.

6. The oven according to claim 5, wherein said conveying and outflow means comprise at least one condensate collection tank placed below said at least one dehumidification portion and at least one condensate outflow channel connected to said at least one condensate collection tank.

7. The oven according to claim 1, wherein said at least one heating heat exchanger is placed at a rear portion of said at least one container.

8. The oven according to claim 1, wherein said at least one heating heat exchanger comprises at least one hollow body having said at least one inlet duct and said at least one outlet duct and is adapted to be crossed by said exhaust gases of said motorcycle.

9. The oven according to claim 1, comprising adjustment means for adjusting a temperature of the air in said at least one inner chamber.

10. The oven according to claim 9, wherein said adjustment means comprise:
   at least one inlet opening formed on said at least one container and adapted to allow entry of fresh air from an outside of the at least one inner chamber towards said at least one inner chamber,
   at least one outlet opening formed on said at least one container and adapted to allow an exit of a hot air from said at least one inner chamber towards the outside of the at least one inner chamber,
   at least one temperature sensor positioned inside said at least one inner chamber, and
   variation means of at least one of an opening and a closure of at least one of (i) said at least one inlet opening and (ii) said at least one outlet opening, operatively connected to said at least one temperature sensor and adapted to vary said at least one of said opening and said closure depending on the temperature of the air inside said at least one inner chamber.

11. The oven according to claim 10, wherein said at least one inlet opening comprises at least one air intake formed on a portion of an outer surface of said at least one container.

12. The oven according claim 1, wherein said at least one container comprises at least one door for access to said at least one inner chamber.

13. The oven according to claim 1, comprising blowing means adapted to take the hot air from said at least one inner chamber and to blow at least one flow of the hot air inside at least one hole formed in the least one container for food positioned in said at least one inner chamber.

14. The oven according to claim 13, wherein said blowing means comprise:
   at least one blowing element of said air flow external to said at least one container, with said at least one blowing element positioned in said at least one inner chamber at a predefined position and height, and
   at least one suction fan positioned in said at least one inner chamber and connected to said at least one blowing element for suctioning and sending the hot air to said blowing element.

15. The oven according to claim 14, comprising a plurality of said at least one blowing element positioned at different and predefined heights and substantially aligned with each other.

16. The oven according to claim 14, wherein said at least one blowing element comprises at least one slot formed on at least one inner coating of said at least one inner chamber.

17. A motorcycle comprising a scavenging system of exhaust gases and comprising at least one oven according to claim 1, connected to said scavenging system.

\* \* \* \* \*